(12) United States Patent
Ricca et al.

(10) Patent No.: US 12,718,843 B2
(45) Date of Patent: Aug. 25, 2026

(54) NON-VOLATILE DATA STORAGE MEDIUM AND SYSTEM

(71) Applicant: ECOLE POLYTECHNIQUE FEDERALE DE LAUSANNE (EPFL), Lausanne (CH)

(72) Inventors: Ruben Ricca, Cadenazzo (CH); Yves Bellouard, Lutry (CH); Martin Vetterli, Grandvaux (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 18/861,072

(22) PCT Filed: Apr. 6, 2023

(86) PCT No.: PCT/EP2023/059238
§ 371 (c)(1),
(2) Date: Oct. 28, 2024

(87) PCT Pub. No.: WO2023/208571
PCT Pub. Date: Nov. 2, 2023

(65) Prior Publication Data

US 2025/0322846 A1 Oct. 16, 2025

(30) Foreign Application Priority Data

Apr. 29, 2022 (EP) .................................... 22170715

(51) Int. Cl.
*G11B 7/24035* (2013.01)
*G11B 7/0045* (2006.01)

(52) U.S. Cl.
CPC ...... *G11B 7/24035* (2013.01); *G11B 7/00456* (2013.01)

(58) Field of Classification Search
CPC ............ G11B 7/24035; G11B 7/00456; G11B 7/2578; G11B 2007/25706;
(Continued)

(56) References Cited

U.S. PATENT DOCUMENTS 5,572,493 A * 11/1996 Maeda ..................... G11B 7/14 369/53.37
6,943,990 B1 * 9/2005 Yokoyama ............ G11B 5/484
(Continued)

OTHER PUBLICATIONS

Ivan B. Angelov, et al., "Optical breakdown of multilayer thin-films induced by ultrashort pulses at MHz repetition rates", Optics Express, vol. 21, No. 25, Dec. 16, 2013, pp. 31453-31461 (9 pages).
(Continued)

*Primary Examiner* — Steven Lim
*Assistant Examiner* — Michelle J. Kim
(74) *Attorney, Agent, or Firm* — Nixon & Vanderhye PC

(57) ABSTRACT

A data storage medium (2) comprising a stacked plurality of layers (9), each layer composed of a layer material selected from a group comprising at least two different dielectric materials, adjacent layers being formed of different materials, and at least one of the layers, that is not a top layer, constituting an information layer (9*i*) configured to be modified locally by energy from an electromagnetic beam (7) having a specific beam wavelength and a propagation direction (Z) transverse to the layers. The stacked plurality of layers include an aperiodic layer arrangement including at least three stacked adjacent layers having different thicknesses with respect to each other.

28 Claims, 13 Drawing Sheets

(58) Field of Classification Search
CPC .. G11B 2007/2571; G11B 2007/25715; G11B 7/24067; G11B 7/24038
See application file for complete search history.

(56) References Cited

U.S. PATENT DOCUMENTS 9,519,104 B1* 12/2016 Mullen ................ G02B 6/1228
2005/0226128 A1* 10/2005 Van Schijndel ... G11B 7/24038 369/125
2009/0016184 A1* 1/2009 Kikukawa ............ G11B 7/1267 369/47.53
2010/0238782 A1* 9/2010 Saito .................. G11B 7/00452
2014/0036328 A1 2/2014 Shi et al.
2016/0158886 A1* 6/2016 Kumar ............... B29D 11/0074 219/121.61
2016/0336036 A1 11/2016 Bhaskaran et al.
2020/0202891 A1* 6/2020 Mendonsa ........... G11B 17/038

OTHER PUBLICATIONS

Ruben Ricca, et al., “Ultrafast laser interaction with transparent multi-layer SiO2/Si3N4 films”, Journal of Applied Physics, vol. 130, No. 243105, published Dec. 29, 2021, pp. 243105-1-243105-12 (12 pages).

Ruben Ricca, et al., “Single-Layer Subwavelength Femtosecond-Laser-Induced Confined Nanocrystallization in Multistack Dielectrics”, Physical Review Applied, vol. 19, No. 044035, published Apr. 12, 2023, pp. 044035-1-044035-11 (11 pages).

D. Schiltz, et al., “Modification of Multilayer Mirror Top-Layer Design for Increased Laser Damage Resistance”, Proceedings of Spie, IEEE, vol. 9237, Dec. 2, 2014, 7 pages.

International Search Report for PCT/EP2023/059238 dated Jul. 3, 2023, 4 pages.

Written Opinion of the ISA for PCT/EP2023/059238 dated Jul. 3, 2023, 13 pages.

* cited by examiner

FIG. 1 (prior art)

$t_A$ $t_B$ Period Λ z

Layer A Layer B

FIG. 2

Layer A
Layer B
Substrate 9 9 11 z 2 1

1
S
w
f)

Beam waist
w
a)
P
b)
10
P
c)
P
d)
10
Radial P
e)
Azimuthal P 2
8
11
Propagation direction
z
Threshold SiO2
Threshold TiO2
LIDT SiO2 = 3.1 – 3.5 J/cm²
(@500 fs, 1030 nm)
LIDT TiO2 = 0.75 J/cm²
(@500 fs, 1030 nm)
Intensity |E|² [a.u.]
0.018
0.016
0.014
0.012
0.010
0.008
0.006
0.004
0.002
0.000
−1
0
1
2
3
4
9i
Front position [μm]

b)
2
8
11
Propagation direction
Z
Threshold SiO2
Threshold Si3N4
LIDT_SiO2 = 3.1 – 3.5 J/cm² (@500 fs, 1030 nm)
LIDT_Si3N4 = 0.15 J/cm² (@500 fs, 800 nm)
Intensity |E|² [a.u.]
0.018
0.016
0.014
0.012
0.010
0.008
0.006
0.004
0.002
0.000
−1
0
1
2
3
4
Front position [μm]
9i 2
8
11
Propagation direction
z
Threshold Al2O3
Threshold Y2O3
LIDT Al2O3 = 2.5 – 2.8 J/cm² (@500 fs, 1030 nm)
LIDT Y2O3 = 1.75 – 2 J/cm² (@500 fs, 1030 nm)
Intensity |E|²[a.u.]
0.018
0.016
0.014
0.012
0.010
0.008
0.006
0.004
0.002
0.000
−1
0
1
2
3
4
9i
Front position [μm]

NON-VOLATILE DATA STORAGE MEDIUM AND SYSTEM

CROSS-REFERENCE TO RELATED APPLICATIONS

This application is the U.S. national phase of International Application No. PCT/EP2023/059238 filed Apr. 6, 2023 which designated the U.S. and claims priority to EP patent application Ser. No. 22/170,715.1 filed Apr. 29, 2022, the entire contents of each of which are hereby incorporated by reference.

FIELD OF THE INVENTION

This invention relates to an optical data storage medium and an optical data storage system therewith.

BACKGROUND OF THE INVENTION

There are many applications that require the storage of information with high spatial density in a permanent durable manner, for instance for conservation of information over a long period of time, or for preserving data in a medium that should withstand harsh environments, for instance subject to high temperatures, and/or high mechanical or thermal stresses, and/or high electrical or electromagnetic fields. Storage of information in a durable manner should not require any power source to be maintained (i.e. non-volatile) and should be difficult to alter and erase in the intended use and storage conditions.

Optical data storage mediums are potentially suitable for permanent durable storage of data. Among these, various studies have investigated the use of pulsed lasers to induce crystallization and other modifications in sub-wavelength multilayer dielectric materials for the permanent storage of data. Work by inventors of the present invention have been presented in one scientific article and in one conference in particular:

Ruben Ricca, Victor Boureau, and Yves Bellouard, *Ultrafast laser interaction with transparent multi-layer $SiO_2/Si_3N_4$ films, J. Appl. Phys.* 130 (2021) doi: 10.1063/5.0065726

*SPIE Photonics West. S. Francisco*—R. Ricca. Y. Bellouard. *Investigation of laser-matter interaction in transparent multilayer thin films,* 2020

This paper and this conference presentation discuss crystallization phenomena and, generally, laser-induced modifications in dielectric multilayers, in particular formed of silicon oxide ($SiO_2$) and silicon nitride ($Si_3N_4$) periodically arranged layers, substantially following a λ/4 design (λ being the wavelength of the pulsed laser). Finite-difference time-domain (FDTD) methods to design the layers and control the crystallization phenomena are also disclosed.

While such methods appear to be very promising for high density durable non-volatile storage of data, the accurate and reliable control of crystallization across layers is difficult to master. There is also a continuous desire to further increase the density of data that may be stored in a physical medium.

SUMMARY OF THE INVENTION

It is an object of the invention to provide a data storage medium, a data storage device with the data storage medium, and a data storage system with the data storage device, that enables non-volatile data storage at a high density in a durable manner.

For certain applications, it is advantageous to provide a data storage system that is durable and stable over a long period of time, for instance exceeding 100 years or more.

For certain applications, it is advantageous to provide a data storage system that is durable and stable in harsh environments, for instance subject to high temperature variations (e.g. >200° C.), or high electrical or electromagnetic fields, or subject to mechanical shocks and vibration, or high moisture conditions (e.g. >95% humidity).

It is advantageous to provide a data storage system that enables rapid writing and reading of data in an efficient and economical manner.

It is advantageous to provide a data storage medium that is compact and easy to handle and store.

It is advantageous to provide a data storage medium that is robust with respect to mechanical loads and shocks.

It is advantageous to provide a data storage medium that is economical to manufacture in high volumes.

It is advantageous to provide a data storage medium that can be made-out of abundant, sustainable materials.

Objects of this invention have been achieved by providing the data storage system and data storage medium according to the independent claims.

Disclosed herein is a data storage medium comprising a stacked plurality of layers, each layer composed of a layer material selected from a group comprising at least two different dielectric materials, adjacent layers being formed of different materials, and at least one of the layers, that is not a top layer, constituting an information layer configured to be modified locally by energy from an electromagnetic beam having a specific beam wavelength and a propagation direction transverse to the layers, wherein the stacked plurality of layers include an aperiodic layer arrangement including at least three stacked adjacent layers having different thicknesses with respect to each other. The information layer is downstream and adjacent the aperiodic stacked layer arrangement.

In an advantageous embodiment, the layer materials are selected from a group of materials including dielectrics, semi-conductors, and a conductive transparent materials.

In an advantageous embodiment, the dielectrics are selected from a group comprising $SiO_2$, $Si_3N_4$, $TiO_2$, $Al_2O_3$, $Y_2O_3$, $TaO_2$, $Nb_2O_5$, $ZrO_2$, $MgF_3$, $HfO_2$, $BaF_2$, MgO, $CaF_2$, $LaAl_2O_3$, $SrTiO_3$ with or without doping, the semiconductors are selected from a group comprising Si, Ge, Te, and III-V semiconductors and their compounds, with or without doping, and the conductive materials are selected from a group comprising Indium Tin Oxide, Al, Au, Ag, Cu, W, Ti and their alloys.

In an advantageous embodiment, the information layer has a thickness t in the propagation direction Z, of equal or less than λ/4η: $t \le \lambda/4\eta$ where λ is said specific beam wavelength and η is the refractive index of the material, the thickness ti of the information layer (9) being preferably in a range of $\lambda/20\eta < ti < \lambda/4\eta$, more preferably $\lambda/10\eta < ti < \lambda/5\eta$.

In an advantageous embodiment, the information layer (9*i*) has a thickness of less than 20% (ti<0.2Lr), preferably less than 15% (ti<0.15Lr), more preferably less than 10% (ti<0.1Lr), of a Rayleigh length Lr of the electromagnetic beam in the data storage medium.

In an advantageous embodiment, each layer of the aperiodic arrangement has a substantially constant thickness over the surface area of the data storage medium, the thickness varying within a tolerance in the range of ±5 nm preferably in the range±2 nm, for instance in the range of ±1 nm.

In an advantageous embodiment, said plurality of layers comprises N layers, N being in the range of 4 to 30 layers, preferably in a range of 5 to 25 layers, for instance in a range of 10 to 20 layers.

In an advantageous embodiment, said information layer is below the top layer and at least another layer and above at least one bottom layer, preferably above at least two bottom layers and below at least two upper layers.

In an advantageous embodiment, the stacked plurality of layers are mounted on a planar or non-planar substrate.

In an advantageous embodiment, the stacked plurality of layers are sandwiched between two substrates, at least one of said two substrates facing the laser-beam being transparent to the beam wavelength.

In an advantageous embodiment, the data storage medium comprise at least a second information layer, said second information layer being separated from said first information layer by at least one further layer, preferably by a plurality of intermediate layers.

Also disclosed herein is a data storage device comprising a data storage medium according to any preceding embodiment.

Also disclosed herein is a data storage system including a data storage device according to the preceding paragraph and a data writer, the data writer comprising a laser source for generating a laser beam constituting the electromagnetic beam configured to generate the modified zone within the information layer, the data writer further comprising or connected to a controller configured to generate a pulsed laser beam.

In an advantageous embodiment, the laser source is configured to focus said laser beam such that a beam waist of the laser beam is positioned upstream of the information layer and within 1.5 of a Rayleigh length 1.5×Lr/2 of the beam with respect to the beam propagation direction Z, preferably within a Rayleigh length Lr, for instance with a Rayleigh half-length Lr/2.

In an advantageous embodiment, the peak power of each pulse of said pulsed laser beam is configured such that the energy intensity at the location of the information layer is up to two times an energy intensity necessary to enable non-linear absorption in the information layer (the so-called laser-induced damage threshold).

In an advantageous embodiment, the data storage device is in the form of a disc configured for being rotated during writing and reading operations, and the data writer comprises a rotating drive on which the data storage device is coupled during writing.

In an advantageous embodiment, the laser source is configured to generate a Picosecond or Femtosecond laser pulse train with a pulse width in a range of 1e(−12) to 1e(−15) seconds and a frequency of between 1 hertz to 1 gigahertz.

In an advantageous embodiment, the laser source is configured, for instance using diffractive elements or adaptive optics means such as deformable mirrors or liquid crystal displays, to deliver static or reconfigurable plurality of focal spots at the location of the information layer, each focal spot acting to generate a modified zone independent from the modified zones generated by other focal spots of said plurality of focal spots.

Further objects and advantageous aspects of the invention will be apparent from the claims, and from the following detailed description and accompanying figures.

BRIEF DESCRIPTION OF THE DRAWINGS

FIG. 1 is a schematic cross-sectional view of a data storage medium showing a known 24 DBR structure with a periodic layer arrangement;

FIG. 2 is a schematic cross-sectional view of a data storage medium according to an embodiment of the invention with an aperiodic layer arrangement:

FIG. 7 is a schematic graph illustrating a shift in reflectance peak between the states of the sample of FIG. 2 before (7*a*) and after (7*b*) laser beam exposure:

DETAILED DESCRIPTION OF THE INVENTION

Figure 10:
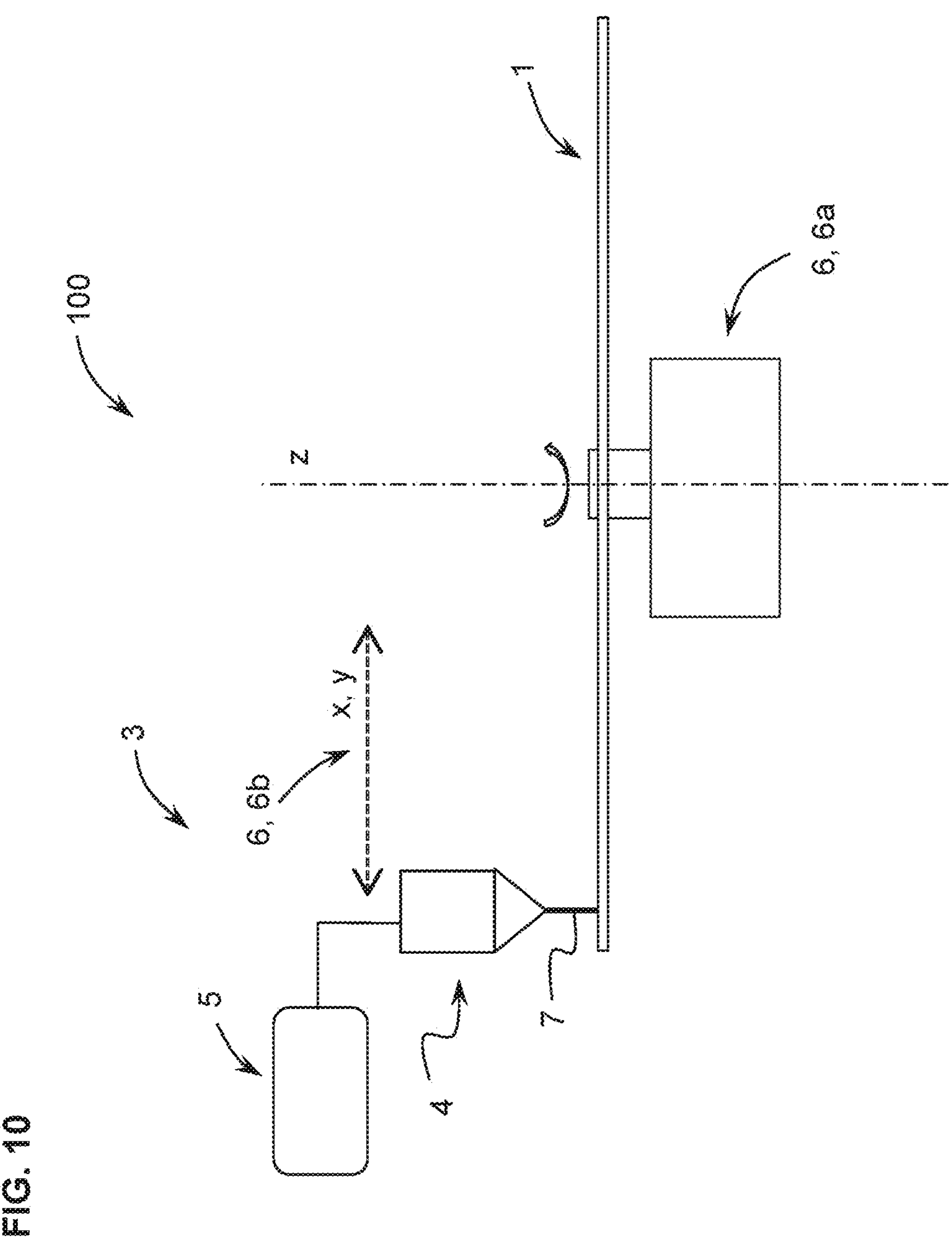
FIG. 10 is a schematic block diagram illustrating a data storage system according to an embodiment of the invention.

Referring to the figures, starting in particular with FIG. 10, an optical data storage system 100 comprises a data storage device 1 and a data writer 3 and/or reader, depending on whether the optical data storage system is for recording data to be stored, or for reading data that is already stored in the data storage device, or for both recording and reading data.

The data writer 3 comprises a laser source 4 generating a pulsed electromagnetic beam 7 of a certain wavelength (herein referred to as the writer beam wavelength), and a controller 5 connected to or forming part of the data writer 3 for controlling the pulsed electromagnetic beam generation for writing operations. The electromagnetic beam may in particular be in the form of a laser beam in a wavelength range of 150 nm to 5 μm, preferably in a range of 150 nm to 1.6 μm. The laser beam is pulsed such that the peak power is sufficient to induce non-linear absorption effects in the layered material.

It may be noted that the data writer may also be configured to function also as a data reader, it being understood that the reader would be controlled to generate a laser beam for reading with a lower energy intensity than the pulsed laser beam during writing.

The reading electromagnetic beam may for instance be a continuous mode beam. The reading electromagnetic beam may have a wavelength that is the same as the wavelength of the writer beam, or may have a wavelength that is different to the wavelength of the writer beam, whereby the criteria for the reader is the ability to pick up the layer material modifications corresponding to data bits in the data storage device. The reading may also be performed using short pulse laser beams to stimulate non-linear optical effects such as higher-harmonic generations (in particular third harmonic or THG) to resolve recorded information comprising physical features actually smaller than the interrogating beam wavelength. In general, principles developed for super-resolution microscopy can be considered for retrieving high-density information recorded in the media.

Furthermore, the data reader may also function using different physical principles, including non-optical methods such as for instance using an electron beam as found in scanning electron microscope (SEM) or transmission electron microscope (TEM) systems. Another possible non-optical reading technology may comprise an atomic force microscope (AFM) and variations, for examples, Magnetic Force Microscopy, Scanning Thermal Microscopy and Scanning Tunnelling microscopy.

The data reader may also be a separate device from the data writer and used only for retrieving stored information from pre-recorded data storage devices.

Finally, the data reader may also read more than one dot of information at a time, thus mapping out an area of information, for instance by acquiring optical images of zones containing bits of information, and processing them to retrieve optically-distinguishable changes of physical quantities, such as optical retardance, localized changes of spectral information or fluorescence emission from laser-induced defects.

The data storage device 1 may for instance be in the form of a disc configured to be supported on a rotating drive **6*b* in a manner similar to conventional optical data storage discs. The data writer or data reader in such case may be mounted on a displacement mechanism 6*b*** that effects at least a translation movement in order to write and read concentric tracks in the data storage medium as per se known in optical data storage systems with rotating discs.

The data storage device according to embodiments of this invention may however be provided in many other forms, for instance on a static support with the reader or writer effecting the displacement, and moreover may be present on a non-planar surface. In other words, many different displacement mechanisms 6 that ensure a relative displacement between the data storage device and the writer and/or reader may be used within the scope of the invention.

The data storage device according the embodiments of this invention may also be written and/or read without actual relative displacement of the data storage device with respect to writer and/or reader. For instance, the use of acousto-optic principles combined with dedicated focusing optics can be used to raster the laser beam of the writer and/or reader over the data storage device, without any part moving, thus achieving high-dynamics.

The data writer and/or reader can also comprise a combination of static optical element and fast-dynamics beam steering principles to achieve the writing and/or reading function. In such case the data storage device may remain static. A per se known configuration is for instance to combine optical scanning mirrors with a dedicated static optics, such as a F-Theta lens. Alternative similar concepts include the use of polygon scanners and dedicated optics.

The data writer can be optically configured to generate multiple foci where the information layer modification threshold is reached, thereby simultaneously forming multiple independent modified zones in the information layer. This can be achieved in a static or dynamic manner, for instance by shaping the writing laser beam using diffractive elements or using adaptive optics means such as deformable mirror and/or addressable liquid crystal devices.

The data storage device 1 comprises a data storage medium 2 comprising a plurality N of stacked layers 9, each layer formed of a layer material selected from a group of different layer materials, said group having at least two different layer materials.

The reference to layer material is intended to mean a material with a certain composition, or a polymorph of a certain composition. In other words, by referring to different layer materials, reference may be made to materials with different compositions, or to materials with the same composition but with different crystalline or non-crystalline forms, such that the interaction of the material with an electromagnetic field is different from one layer material to another layer material. In examples provided in the present disclosure, layer materials of different compositions include silicon dioxide ($SiO_2$), titanium dioxide ($TiO_2$), silicon nitride ($Si_3N_4$) and aluminium oxide ($Al_2O_3$). Various polymorphs of those compositions may also be used as a layer material. Various other dielectric materials as well as transparent or semi-transparent materials that can have conductive or semi-conductive properties may be considered for use in the data storage medium.

The modification of the information layer is enabled by non-linear absorption of the laser beam by its constituting material(s). Therefore, this material needs to have a certain degree of transparency to the laser's wavelength (for example, a transmission rate >30%), and simultaneously a reduced linear absorption coefficient. The layer materials should thus have a degree of transparency preferably greater than 30% (>30%) with respect to the wavelength of the writer electromagnetic beam, which may be in a range from 150 nm to 5 um.

Figure 5:
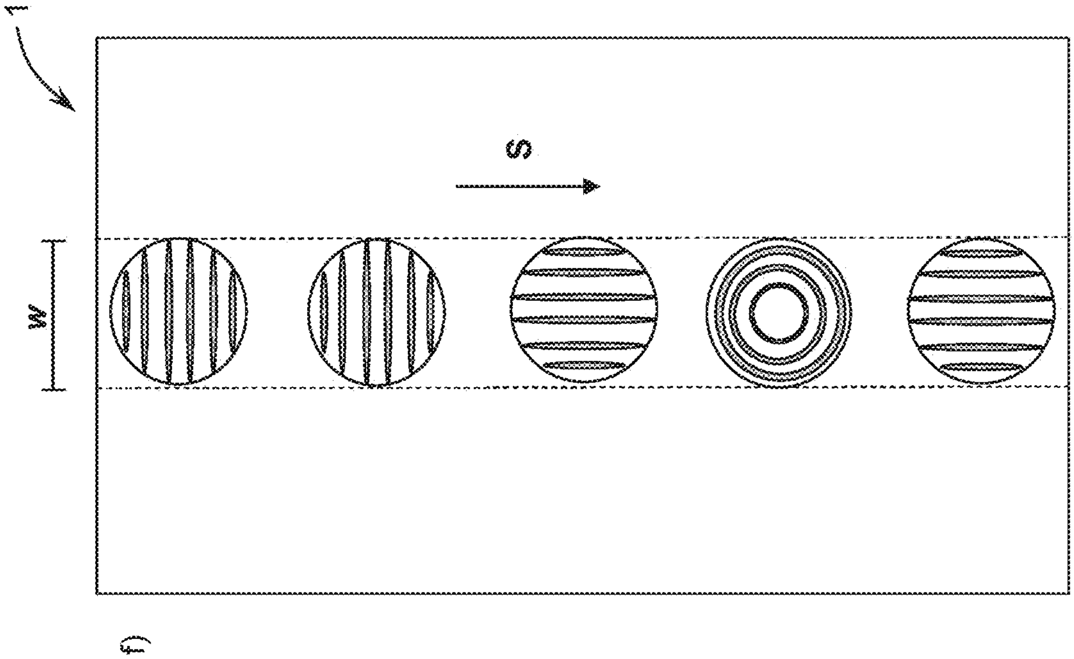
FIG. 5 is a view of modified zones of a data storage medium after laser beam exposure, seen in a direction of propagation A of the laser beam, whereby views a) to e) illustrate different laser-induced modifications by varying for instance the polarization direction P of the laser beam, and view f) illustrates a plurality of modified zones written in a data storage medium along a laser beam scanning direction S.
Figure 5:
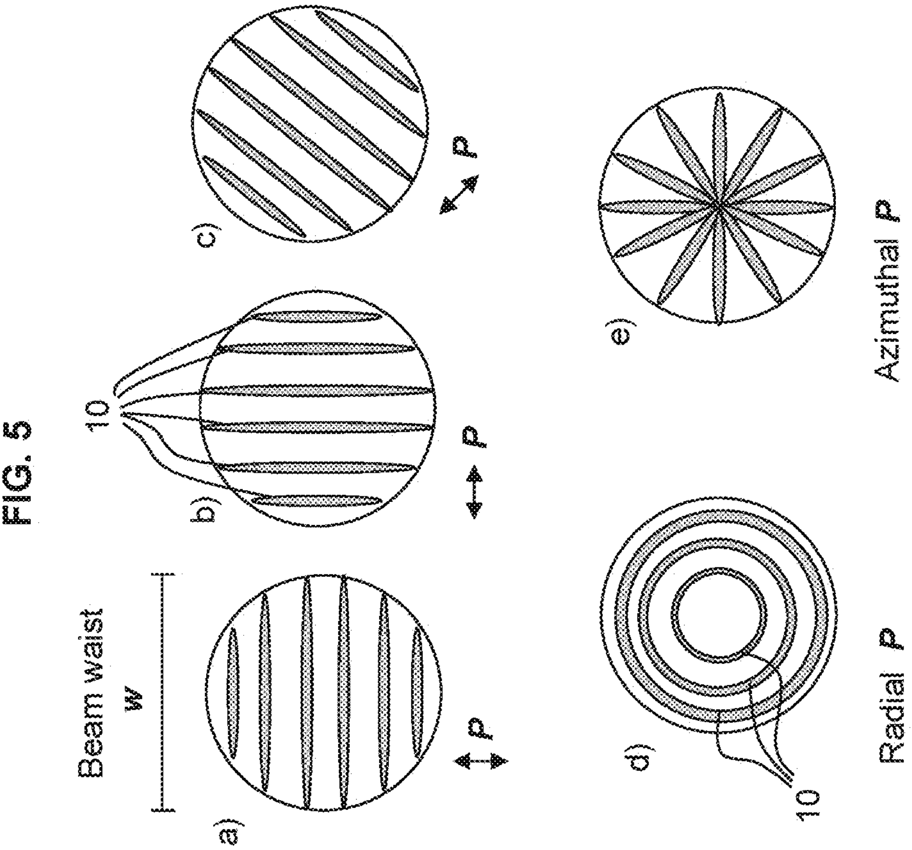

The criteria for choice of the material are their capacity to modulate the electric field intensity created by the electromagnetic beam used for writing data, whereby at least one of the layers should be permanently modifiable locally in the presence of an electromagnetic field having an energy intensity exceeding a predefined threshold configurable in the data writer. The permanent localised modification of the material structure may include various discernible localized modifications including crystallisation of the material, creation of voids, densification, atomic intermixing and phase transitions. This permanently modified structure can form a single volume or be arranged in a pattern forming inside or in the immediate vicinity of the focal volume of the laser beam as illustrated in the examples of patterns a) to e) in FIG. 5. These patterns may be self-organized with a predefined periodicity defined in a plane perpendicular to the laser propagation direction Z and may have a preferred orientation in the affected information layer that is controllable with the laser beam polarization P. Examples of patterns are illustrated schematically in FIG. 5, showing modified zones 10 of a data storage medium after laser beam exposure, seen in a direction of propagation A of the laser beam. Views a) to e) illustrate different laser-induced modifications by varying the polarization direction P of the laser beam. These are just examples, and more complex polarization state can be used. Each modified zone may represent for instance a single bit of information in a more than binary data storage system. For instance, if each of the different modified zones of views a) to e) were each to represent a different bit, the five different zones would allow to construct a 5 bit data storage system. View f) illustrates schematically a plurality of bits written in a data storage medium along a laser beam scanning direction S. Instead of, or in addition to polarization, it may be noted, that laser-induced modifications may also be varied by controlling other laser-beam properties such as the pulse energy, pulse periodicity, wavelength and number of pulses.

Figures 6, 7A, 7B:
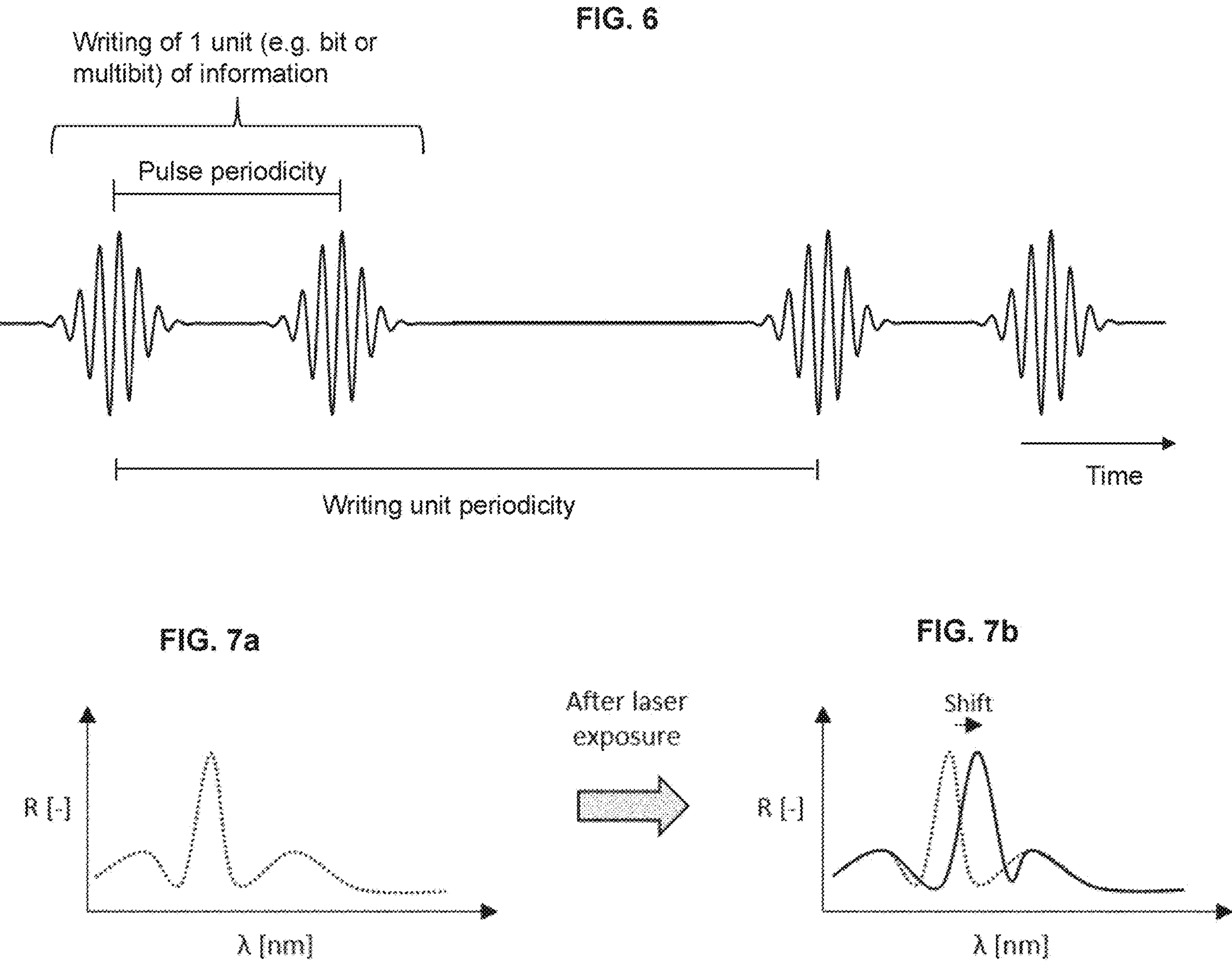
FIG. 6 is a schematic view of an example of a laser beam pulse signal for writing data.

FIG. 6 schematically illustrates an example of a laser beam pulse signal for writing data, whereby a modified zone representing a unit of information may require a single pulse or a plurality of pulses (in the illustrated example two pulses are shown for a single unit/bit of information).

Figures 1, 2:
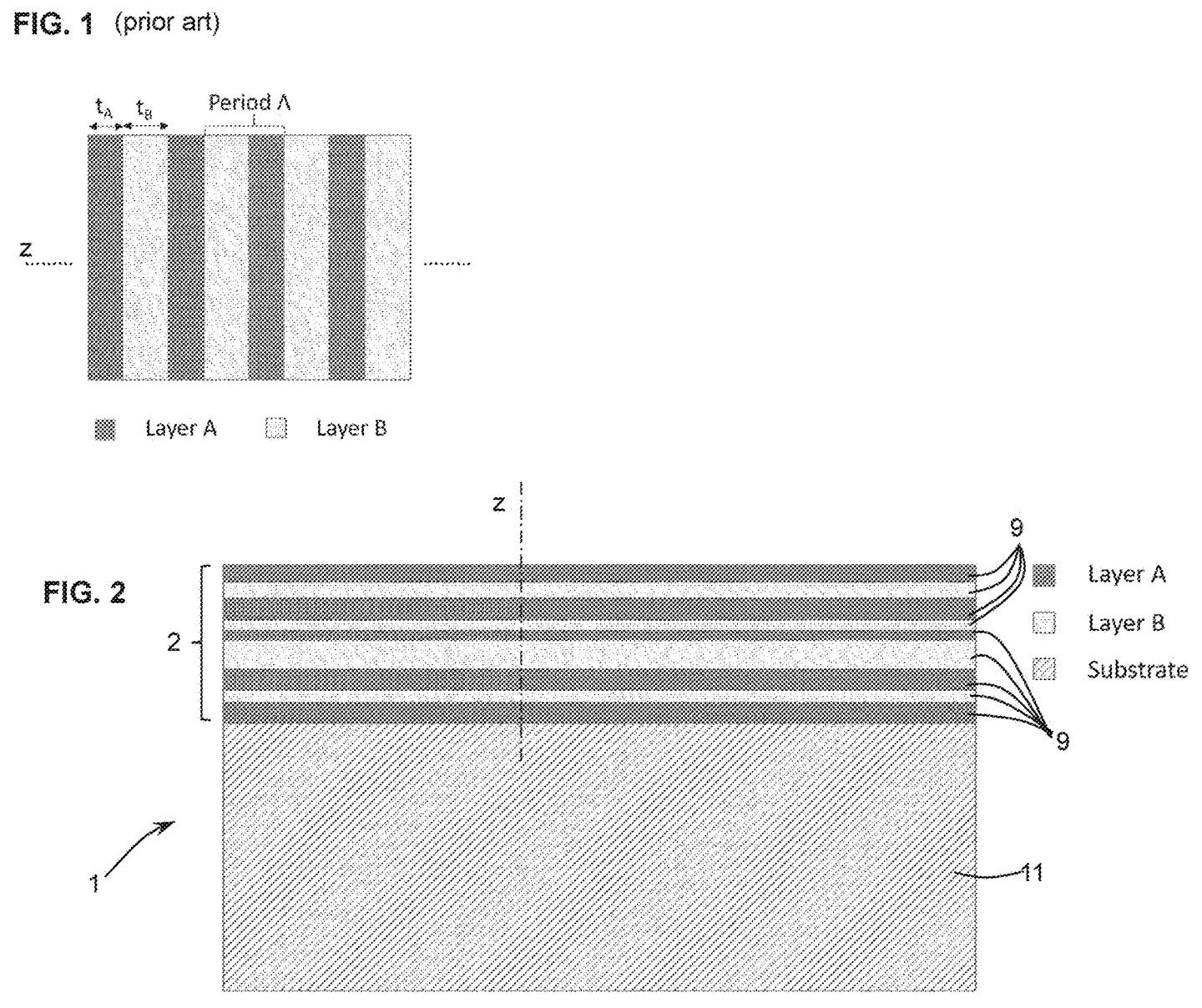

According to the invention, the data storage medium comprises at least three stacked adjacent layers forming an aperiodic arrangement of stacked layers, adjacent layers being of different layer materials. The meaning of "periodic" as used herein is a repeating sequence of at least two layers. In the prior disclosed optical data storage medium as illustrated in FIG. 1, each layer has a thickness ta, tb that may (or may not) be geometrically different but through which the beam propagation time is substantially equal, and in particular corresponds to a thickness of a quarter wavelength divided by the material refractive index $\lambda/4\eta$ (the propagation time is inversely proportional to the refractive index $\eta$ of a material for a specific electromagnetic field, thus equivalent layer thicknesses in terms of propagation time may be expressed as the wavelength $\lambda$ divided by the refractive index $\eta$ of the material, i.e. $\lambda/\eta$). The term "aperiodic" in the present description means that the beam propagation times through the layers of a stack of at least three layers are of mutually different magnitudes.

In the invention, the data storage medium may comprise an aperiodic arrangement comprising a number of stacked layers greater than three.

The data storage medium may also include periodic arrangements of stacked layers in addition to the at least one aperiodic arrangement of stacked layers.

A very surprising result of the aperiodic arrangement of stacked layers as will be described in more detail hereinafter, is that it enhances the concentration of very localized modifications of at least one of the material layers downstream of the aperiodic stacked layer arrangement or in a downstream layer within the aperiodic stacked layer arrangement, with respect to the laser beam source.

An aperiodic stacked layer arrangement allows surprisingly to form localized modifications in at least one of the material layers (that we shall define herein as the information layer) on the one hand of smaller size compared to modifications obtained with a periodic stacked layer arrangement, and on the other hand in a well-defined position (depth) zi in the direction Z of propagation of the beam. The easier confinement of the modification in a precise layer is a feature that allows very accurate and reliable high density writing with less control difficulties than can be achieved with a periodic layer arrangement.

The plurality of layers forming the data storage medium is preferably greater than 4, more preferably greater than 5, and typically in a range of 5 to 25 layers, for instance in a range of 10 to 20 layers.

The material layers may be formed by various per se known manufacturing techniques, for instance various vapor deposition techniques, including evaporation, plasma-enhanced, e-beam or ion-beam assisted processes, pulse-laser deposition among others. All or most of the material layers preferably each have a thickness t of less than a wavelength $\lambda$ of the electromagnetic beam ($t<\lambda/\eta$), preferably less than half a wavelength of the electromagnetic beam ($t<\lambda/2\eta$).

The information layer may advantageously have a thickness of less than a quarter of a wavelength ($t<\lambda/4\eta$), preferably less than 20% of a wavelength $t<\lambda/5\eta$, for instance in a range of $\lambda/5\eta<t<\lambda/10\eta$. Advantageously, the very thin information layer in which localized modifications occur generates very small localized modifications and thus allows a very high density of data to be stored for a given surface area. Although the layer materials may be principally dielectric layer materials, it is possible within the scope of the invention to have one or more layers of non-dielectric material such as metallic layers or semi-conducting materials.

It may be noted that the information could be provided with a thickness that varies at a certain frequency, the period corresponding to the separation distance between modified zones 10. This feature may help to better position the modified zone concentrating the laser pulse energy in the pinch portion of the layer in order to ensure more accurate positioning of the modified zones and corresponding easier reading of the data contained in the zones.

It may moreover be noted that the modified zone may be modified with different energy levels that cause transformations in the material structure that differ depending on the energy level. For instance, the energy deposited by the pulse may generate a modified crystallised structure, or may generate a void, or may create nano-pores, or localized densification without crystallization. These may be read in order to have a greater than 2-bit storage system. With two different modifications, a 3-bit storage system is created (for instance no modification, void, modified crystallised structure).

With more modifications, a greater than 2 or 3-bit storage system may be implemented. Self-organization in the modified information layer may add a greater number of bits in the level of information storage. For instance, as schematically represented in FIG. 5, the orientations of self-organized patterns may be governed by laser polarization, and thus can be controlled to provide a large number of variations.

In a variant, there may be more than one information layer, a first information layer and a second information layer. The second information layer is preferably positioned above the first information layer at a certain distance that allows a reliable separation for the writing and reading operations. The first and second information layers should be separated by at least one dielectric material layer, preferably separated by a plurality of dielectric material layers.

The distance between the first and second information layers is preferably about or greater than a 10 nm, ideally greater than 50 nm. This would allow the reader and writer to more easily adjust the focus such that the beam waist is sufficiently accurately positioned in the direction of propagation for reliably writing in the second information layer, and for reliably reading the data bits in the second information layer without interference from the data bits in the first information layer.

Femtosecond laser pulse exposure of the data storage medium triggers non-linear absorption events, enabling localized structural material modifications with characteristic dimensions that can be smaller than the diffraction limit. In the present invention, it has been found that layered dielectric materials with non-regular layer stacking thicknesses having sub-wavelength thickness, enable the interactions causing material modification to be confined to a single layer (the information layer) of a sub-μm thickness. The interaction of the laser beam pulses with the stacked material layers is influenced by both the geometry and the material composition of the stacks. The laser's electrostatic field intensity profile changes according to the layer thicknesses and material compositions. By modifying the thicknesses distribution of the layers, the high-intensity energy peaks positions are shifted, and, in turn, the material modification threshold is modified as well. The surprising finding is that a non-regular arrangement of layers can lead to the confinement of energy in a one or a few specific layer(s) of the stack having a thickness substantially smaller than the laser beam wavelength. An important aspect of the present invention is thus that the non-regular multilayer structure of the data storage medium induces the confinement of the electric field's intensity in one specific layer of the stack, possibly in two or three specific layers, such that the occurrence of laser-induced modifications along the optical propagation axis occurs at sub-wavelength dimensions at a precise position both horizontally and vertically within the data storage material.

Laser-induced modifications, which include localized nano-voids, densification, atomic intermixing and phase transitions, can be confined within individual layers by controlling the layers thickness arrangement and their compositions, as well as the laser-exposure parameters.

The difference in optical properties between modified and unmodified regions can be subsequently read out to retrieve the stored information. Other local physical properties changes could be probed with other technological means as mentioned above as a method to retrieve stored information.

One of the advantages of this invention in conjunction with the high storage density, is the high data storage durability (>100 years, e.g. >1000 years) in view of choice of the layer materials that may be used. Certain constituting materials such as $SiO_2$, $TiO_2$, and other ceramic and dielectric non organic materials that may be used as layer materials are durable and impervious to atmospheric change, making them resistant to high temperature (up to, and above, typically 500° C.), humidity, fire and electromagnetic fields, therefore suitable for permanent durable data storage. The invention also enables a great versatility in the constituting materials choices.

To increase the density of information, writing in multiple layers can be performed as discussed above.

Details of Example Embodiments

Laser and Processing Parameters

The confinement of the modifications in an information layer, based on non-linear absorption, requires laser pulses with high peak-power, for instance with pulse durations in the picosecond to femtosecond regimes. As the absorption process is non-linear, the laser wavelength can be chosen somewhat arbitrarily, but needs to be compatible with optical properties of the dielectric substrates (transmittance and linear absorbance at the laser wavelength). Information in a given location in the information layer can be stored using a single pulse or using multiple overlapping pulses. The type of information may be further controlled through beam shaping technique, either temporarily or spatially, as well as by controlling the polarization state of the beam. Spatial beam shaping can be achieved using either computer-controlled beam-shaping devices, such as liquid crystal arrays or deformable mirrors, or using dedicated optical components such as axicons.

The writing process may or may not require scanning the beam over the surface to form patterns. In such case, the scan speed needs to be varied according to the repetition rate and the desired laser net fluence (or deposited energy) $E_d$, since these physical quantities are, in a first approximation, related by the following equation:

$$E_d = \frac{4E_p f}{\pi w v}$$

Where $E_p$ is the pulse energy, f the repetition rate, v the scan speed, w the laser beam waist.

The beam confocal parameters (beam waist and Rayleigh length), defining focusing conditions, are defined by the optical components used. These confocal parameters define the irradiance and fluence thresholds for specific non-linear absorption processes. This is expressed by the numerical aperture (NA) of the objective lens, whose value is <1 if the processing is done in air, but can be >1 if a high refraction index medium is placed between objective and substrate. As an embodiment, the NA should be high enough to locally reach an energy density threshold, but low enough not to damage the substrates. A NA value of 0.4 has for instance been used for the writing of the storage medium embodiment illustrated in FIG. 8. Alternatively, selective spatial temporal focusing (SSTF) as described in Vitek et al.[1] methods could be used to achieve similar results, with low numerical aperture, even lower than 0.1. Likewise, non-Gaussian beam, such as Bessel beams that can be produced by special components such as axicons or using digitally controlled beam focusing methods can be considered.

[1] Vitek D N. Block E. Bellouard Y. Adams D E. Backus S. Kleinfeld D. Durfee C G. Squier J A. Spatio-temporally focused femtosecond laser pulses for nonreciprocal writing in optically transparent materials. Opt Express. 2010 Nov. 22; 18(24):24673-8. doi: 10.1364/OE.18.024673. PMID: 21164813; PMCID: PMC4157520.

Layers Design

To achieve localized confinement both in the transverse plane XY and along the propagation axis Z, the individual layer thickness, thickness distribution, and material composition of the aperiodic layer arrangement are selected to modulate and confine the laser pulses' electric field's intensity in one or possibly in two or three specific, or even more information layers such that the local energy density is above the non-linear absorption threshold of the material in the information layer. This aperiodic design differs from the known homogeneous λ/4 design, which is a standard design used in the conception of multilayer structures known as Distributed Bragg Reflectors (DBR). In the λ/4 design, layers of 2 different materials alternate periodically (see FIG. 1*a*), with the individual thickness $t_i$ of each layer calculated by $t_i=\lambda/(4n_i)$, with λ as the wavelength which one wants to reflect, and n, the refractive index of the material (i)

composing the layer. The individual thickness of a layer composed by a certain material is therefore constant through the whole stack.

Figure 11:
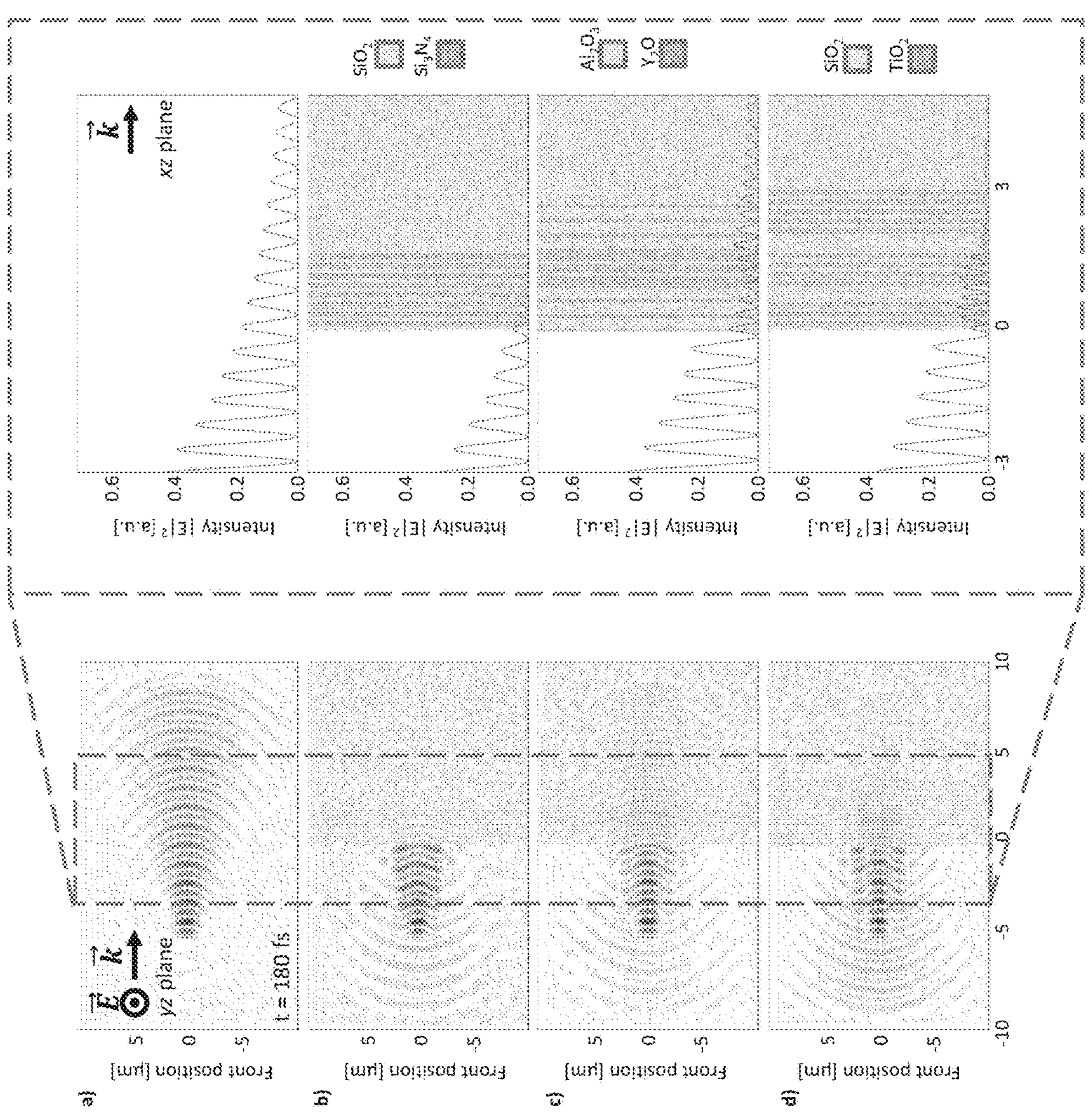
FIG. 11 show graphs of electric field profile of a pulse propagation in a) air, b) a periodic multilayer stack, c) a combination of three distinct layered structures and d) a multilayer stack whose periodicity is disrupted by two spacer layers. While the regular, periodic DBR results in exponential decay of the electric field, the other designs result in field modulation along the layered structure.

In the present invention, the individual layer thicknesses of the layer stack may be calculated with computer modelling of the electromagnetic intensity of the laser pulse electric field along the multilayer pattern, including the confocal parameters and the materials parameters. The modelling exploits the aperiodic design to confine the pulse energy in a specific interface (the information layer(s)), where the laser-induced material modifications take place. The design of the layers can be totally aperiodic. i.e. different thickness of all the layers, or with some level of repetition or continuity of the individual layer thicknesses (see FIG. 11*d*), or alternatively, can comprise different periodic stacks (where the thickness for each material is constant within a single stack, but different between distinct stacks) placed on top of each other (see FIG. 11*c*). The precision required for the deposition is preferably in a range less than +/−5 nm per layer's thickness, preferably in a range of less than +/−2 nm, for instance of the order of +/−1 nm with respect to the intended (e.g. computer modelled) layer thickness, which is within current industry standards, and which allows to not change the confinement effect noticeably, compared to the computer simulations used for the layer stack design. In case of a periodic design of the layers, as illustrated in FIG. 11*b*), no confinement of the pulse energy occurs, but the field decays exponentially.

Based on computer simulations performed on embodiments of the present invention, the number of layers that are advantageous to have a reliable confinement, a well-defined reflectance interval, and a total thickness comparable to the Rayleigh length of the beam, is between 5 and 25 layers, preferably between 10 and 20 layers.

Figure 8:
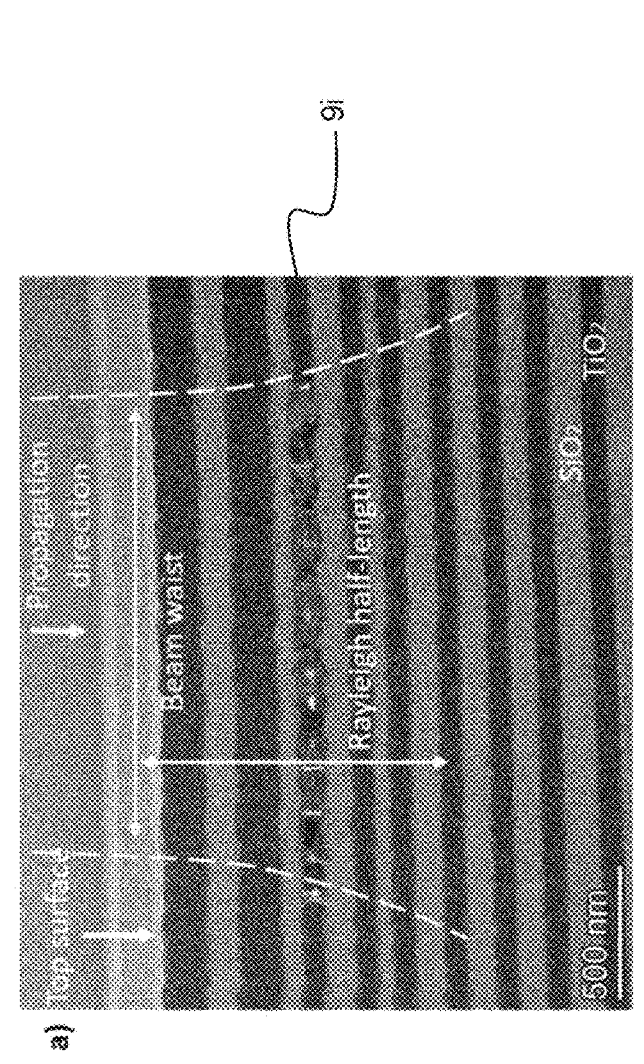
FIG. 8 *a*) is a transmission electron beam (TEM) image of a data storage medium according to an embodiment of the invention, overmarked with laser beam propagation direction and exposure zone and dimensional indication, and FIG. 8 *b*) is a magnification of the modified zone showing which modifications are induced by the laser.
Figure 8:
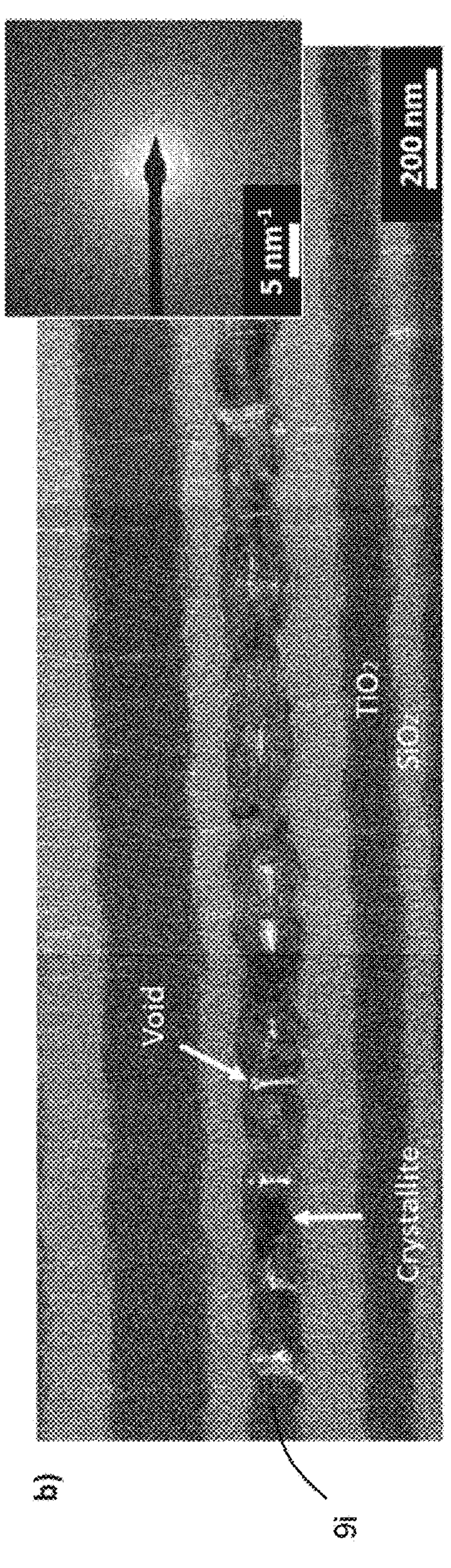

In the embodiment illustrated in FIG. 8, an alternating material structure comprising $SiO_2$ and $TiO_2$ has been tested. From R. Ricca, V. Boureau, and Y. Bellouard, *J. Appl. Phys.* 130, 243105 (2021) it is known that crystallization may be effected in other multilayer systems such as $SiO_2/Si_3N_4$. Within the scope of this invention, a variety of other dielectric materials (i.e. materials with a bandgap >3 eV) may be considered. The choice of the materials is not necessarily restricted to binary systems, but can be expanded to multi-materials systems, for instance using three or four different compositions, like for instance $SiO_2/Si_3N_4/TiO_2/Al_2O_3$ multilayers. Electric field intensity modulation has also been shown in dielectric multilayers including one or more metallic films, therefore the layer materials may include one or more metallic films within the scope of the invention.

If durability of the data storage device is an important criteria, depending on the application, the constituting materials of the information layer and other material layers is an important design consideration, as the stability of the laser-induced modifications in time, with respect to typical temperature fluctuations, atmospheric conditions, chemical, magnetic and electrical accidents, enables this technique to be used for permanent data storage in a lossless medium. Generally speaking, inorganic dielectric materials are known for being resistant to atmospheric degradation. That being said, one can sacrifice some aspects of durability in favor of better optical performances of a less durable material in applications where the data storage durability is not a critical factor.

Substrate

The multilayers structure described above is itself formed or deposited on a substrate. This operation can be done using various processing techniques, including spraying, evaporation, sputtering, chemical vapor deposition techniques, or pulse laser deposition methods. In the particular embodiment described in the FIG. 8, the substrate is planar, but this is not a necessary requirement. The substrate could also be a three dimensional form, for instance a cylinder or a sphere or other 3D shapes provided that the multilayers can be formed or deposited on the substrate for instance using one of the methods described above. The substrate can be transparent or not, and the substrate may also be made of a dielectric material, a glass, a semiconductor or a metal.

In a variation of the illustrated embodiments, the multilayer structure can also be sandwiched in between two substrates, at least one of the substrates being transparent to the writing laser beam in a way so that the laser beam can further interact with the multilayer data storage medium.

How to Write

Figure 3:
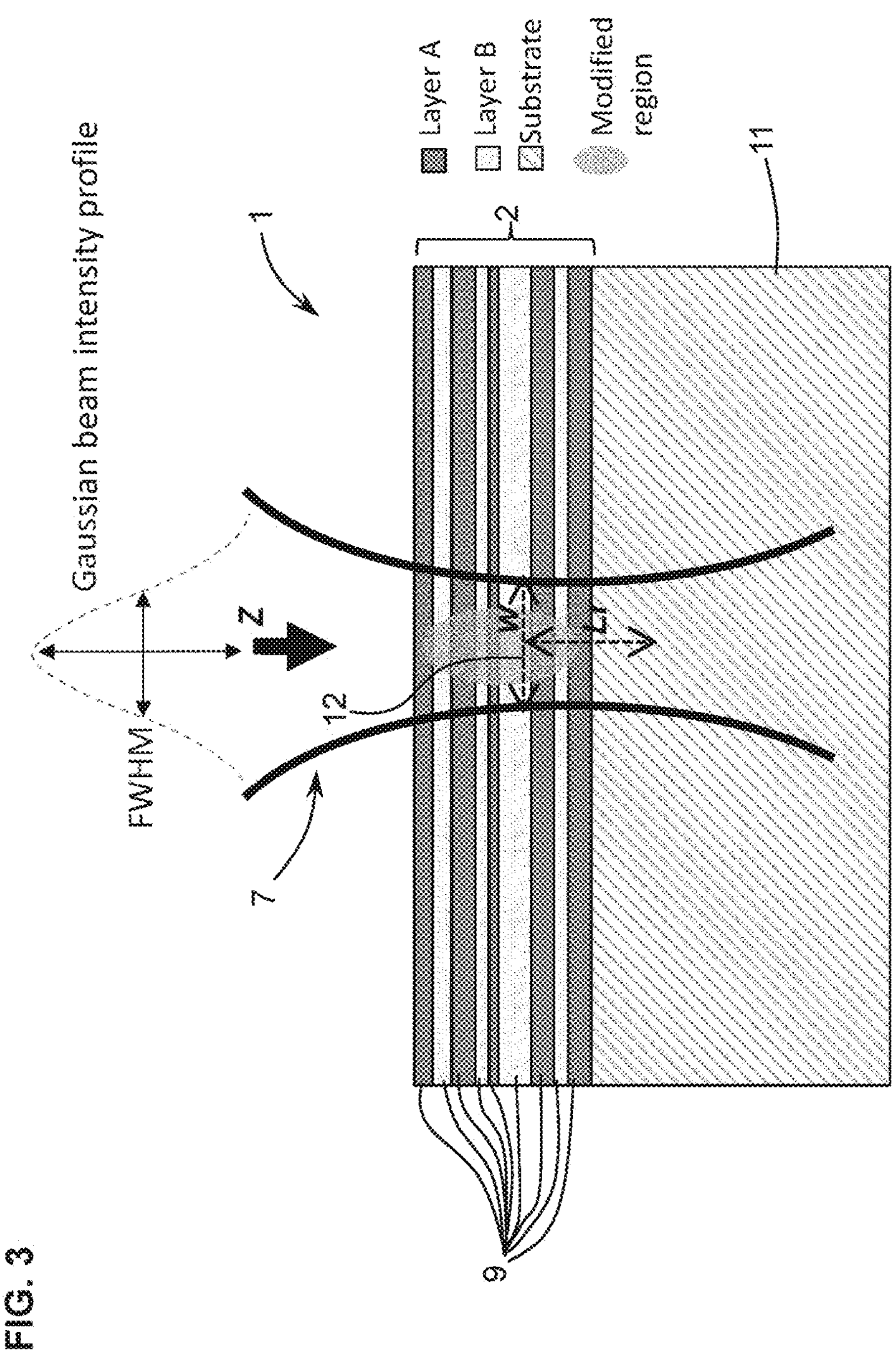
FIG. 3 is a view similar to FIG. 2 of the data storage medium subject to laser beam exposure.
Figure 4:
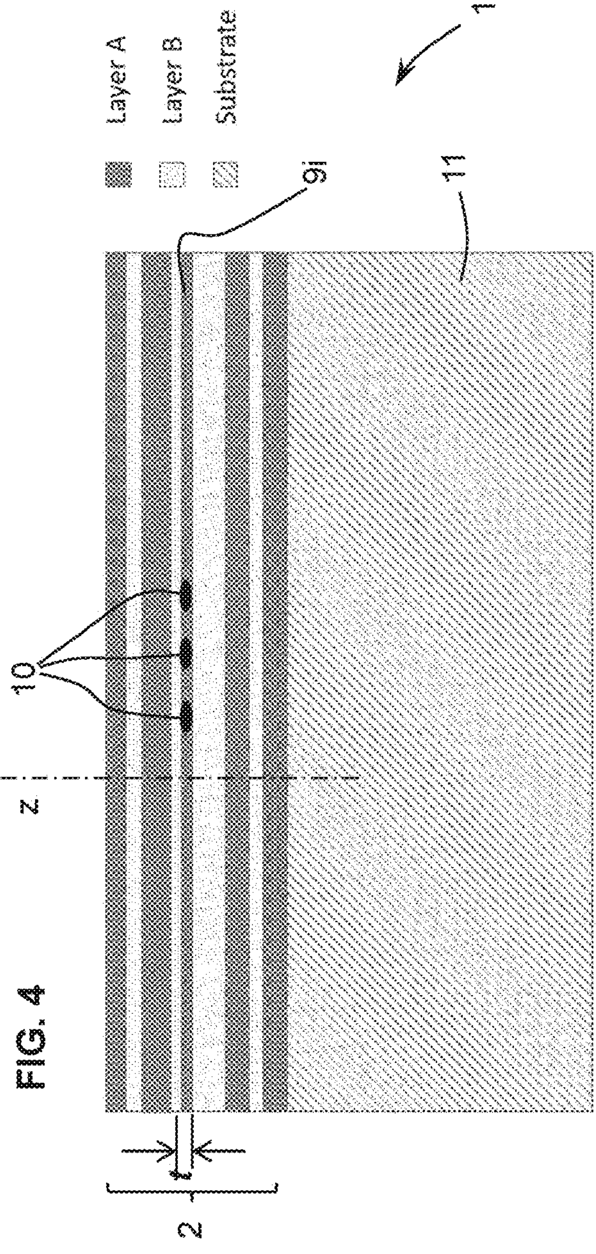
FIG. 4 is a view similar to FIG. 3 after laser beam exposure, whereby after exposure, the resulting laser-induced modifications are confined within a single, or multiple, selected layers.

The physical execution of the writing is relatively straightforward and may be performed with existing laser beam systems technology suitably controlled. A femtosecond laser single pulse or a pulse train is focused in proximity or on the surface of the multilayer data storage medium (this distance depends on the confocal parameters). Due to the modulation of the electric field induced by the stacked layers with an aperiodic arrangement, a specific layer (i.e the herein defined information layer), or a set of specific layers, is/are permanently modified thanks to non-linear absorption as illustrated in FIG. 2-4. A parameter controlling the non-linear absorption phenomena is related to the peak power of the laser beam. By peak-power here, we mean the power of a single pulse. As an example for the case of femtosecond pulse durations, typical order of magnitude for such peak-irradiance are from $10^9$ W/cm$^2$ to $10^{12}$ W/cm$^2$ at the focusing spot. If the peak-irradiance exceeds a material-dependent threshold value, non-linear absorption occurs locally in the regions where this peak irradiance threshold is reached. An important consequence of this non-linear effect for the present application is that the size of the laser-written modifications can be effectively and substantially smaller than the wavelength of the laser, overcoming diffraction limits conditions.

A femtosecond laser platform with a moving stage or scanning beam system may be used, with a mechanism for finding the surface and a program controlling the movement of the platform (or the scanning elements) in the controller 5. The writing may generate single modified zones (pixels) each corresponding to discrete information, or may generate a plurality of modifications. Information can be discretized in binary packages (0 and 1) with corresponding spectra, but if other parameters are considered (which layer is modified, modification size, crystalline or micro-void modifications, or orientation of the periodic modulation in the recording layer plane, the density of information per pixel can be higher and the overall density of information increased exponentially, and the data can be translated into a multi-digit (>binary) system. In principle, several types of modifications can be obtained by exposure to femtosecond lasers, notably densification, atomic intermixing, micro-voids, self-organized periodic arrangement of modifications, and crystallization. In experiments on embodiments, crystallization has repeatedly been obtained with a range of experimental conditions, and offer a reliable way to alter the optical and electronic properties of a material locally. Moreover, the properties of a crystalline phase are more homogeneous, reliable and less fluctuating than a case of intermixing or densification.

The data storage system comprises a digitalization algorithm executed in the controller 5 to convert the data bits to be written into instructions for the data writer laser source, so that information can be physically written into the data storage medium.

How to Read

Localized modifications, notably crystallization, induce localized refractive index changes and introduce crystalline/amorphous boundaries. This affects the behavior of a reading beam passing through the modifications, if compared with a passage through a pristine medium prior to writing. Reading can be achieved by various means. Optically, it can be done for instance by:

- Measuring the reflectance/transmittance locally (see FIG. 7)
- Measuring the phase delay of a probe wave for instance by digital holographic microscopy (DHM)
- Observing phase retardance through interferometric or wavefront distortion measurements
- Measuring the fluorescence of the laser-induced modifications
- Measuring higher harmonic generation when probing the laser-induced modifications with ultrafast lasers.

The size of the modified zones is much smaller than the wavelength of the processing laser, hence the dimensions are sub-diffraction limited and therefore, storage density is much higher than, for instance a conventional digital video disc (DVD), and more durable than a conventional DVD. Storage density may be further increased if the design of the layers and the reading system allow for the writing/reading of information on multiple layers on the same spot, and or each if each spot represents more than binary information.

Examples

FIG. 8 illustrates an example embodiment that has been tested, comprising aperiodic alternating $SiO_2/TiO_2$ amorphous layers exposed to a femtosecond laser and for which some of the exposure parameters resulted in the confinement of laser-induced modifications. For instance, in FIG. 8, it is shown that the crystalline zones are confined along the vertical direction within 100 nm, while the Rayleigh length in that is about 2.5 μm, or about 25 times greater amplitude than the information layer thickness.

Figure 9:
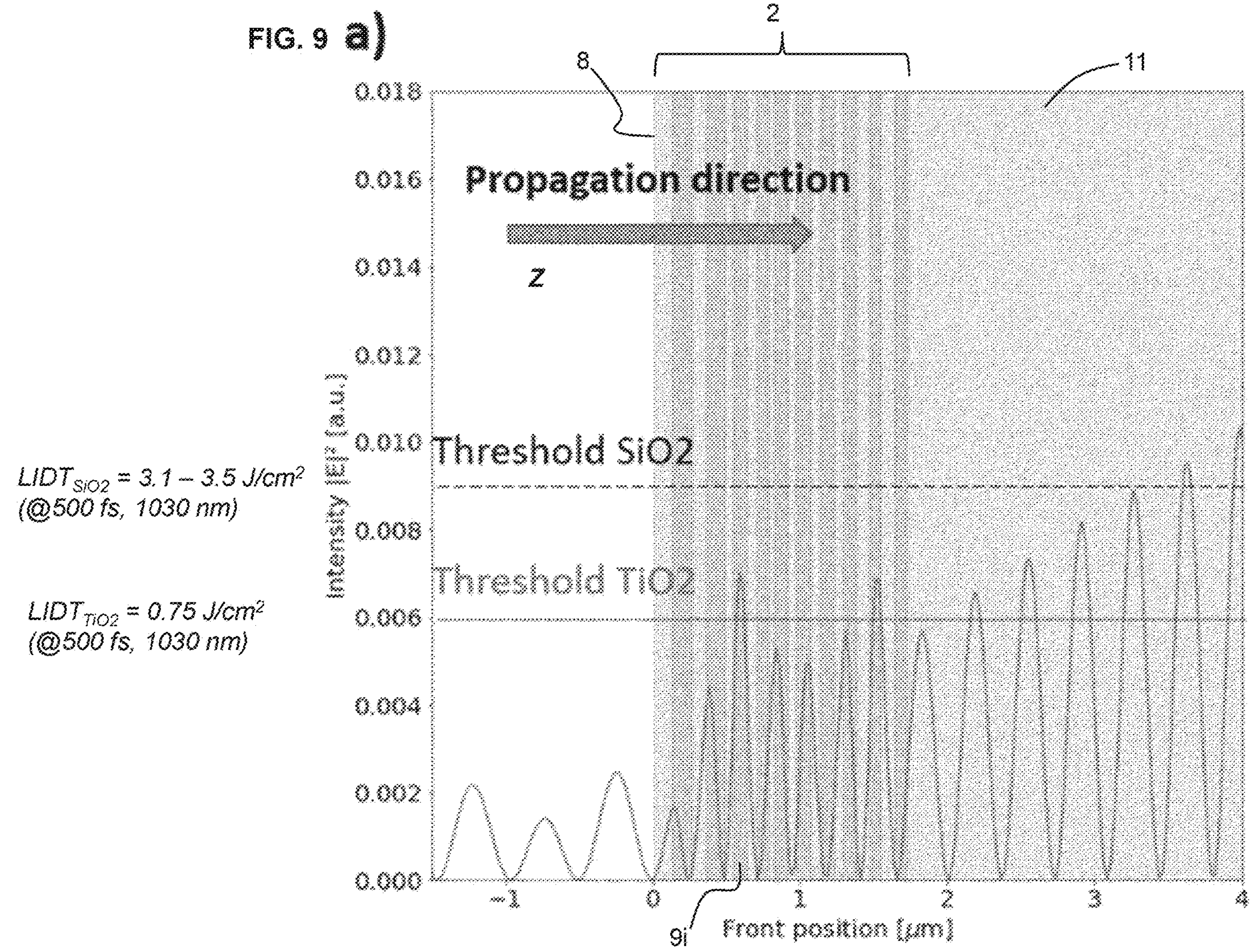
FIG. 9 show graphs of electric field profile in a) $SiO_2$/$TiO_2$ embodiment, b) embodiment with layers of $SiO_2$/$Si_3N_4$ and a thicker $SiO_2$ layer in between, and c) another layer design with $Al_2O_3$/$Y_2O_3$; the horizontal lines represent the laser-induced modification threshold for the layers' materials, and the high-index material is shown in dark grey, the low-index material is shown in light grey, air is shown in white.
Figure 9:
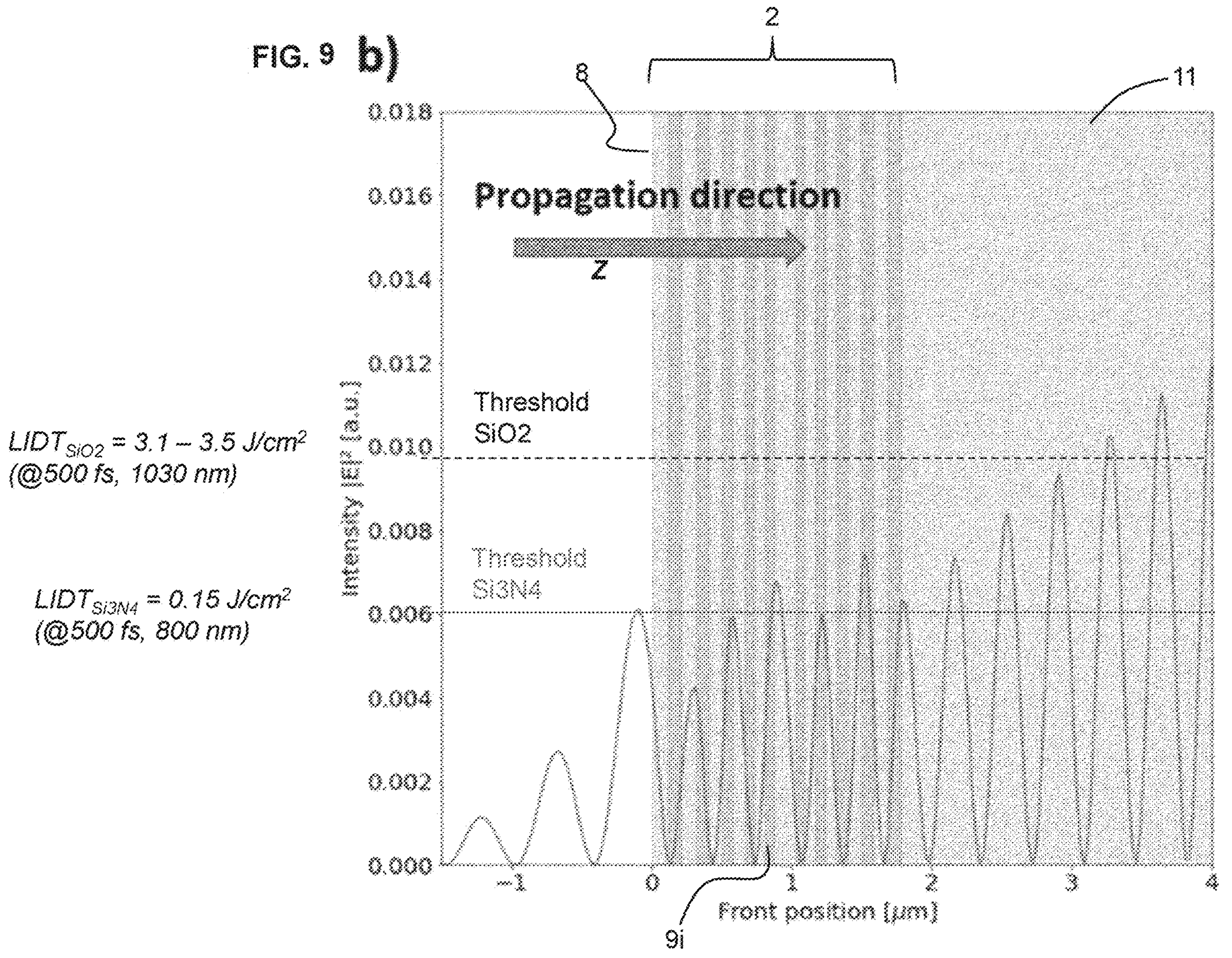
Figure 9:
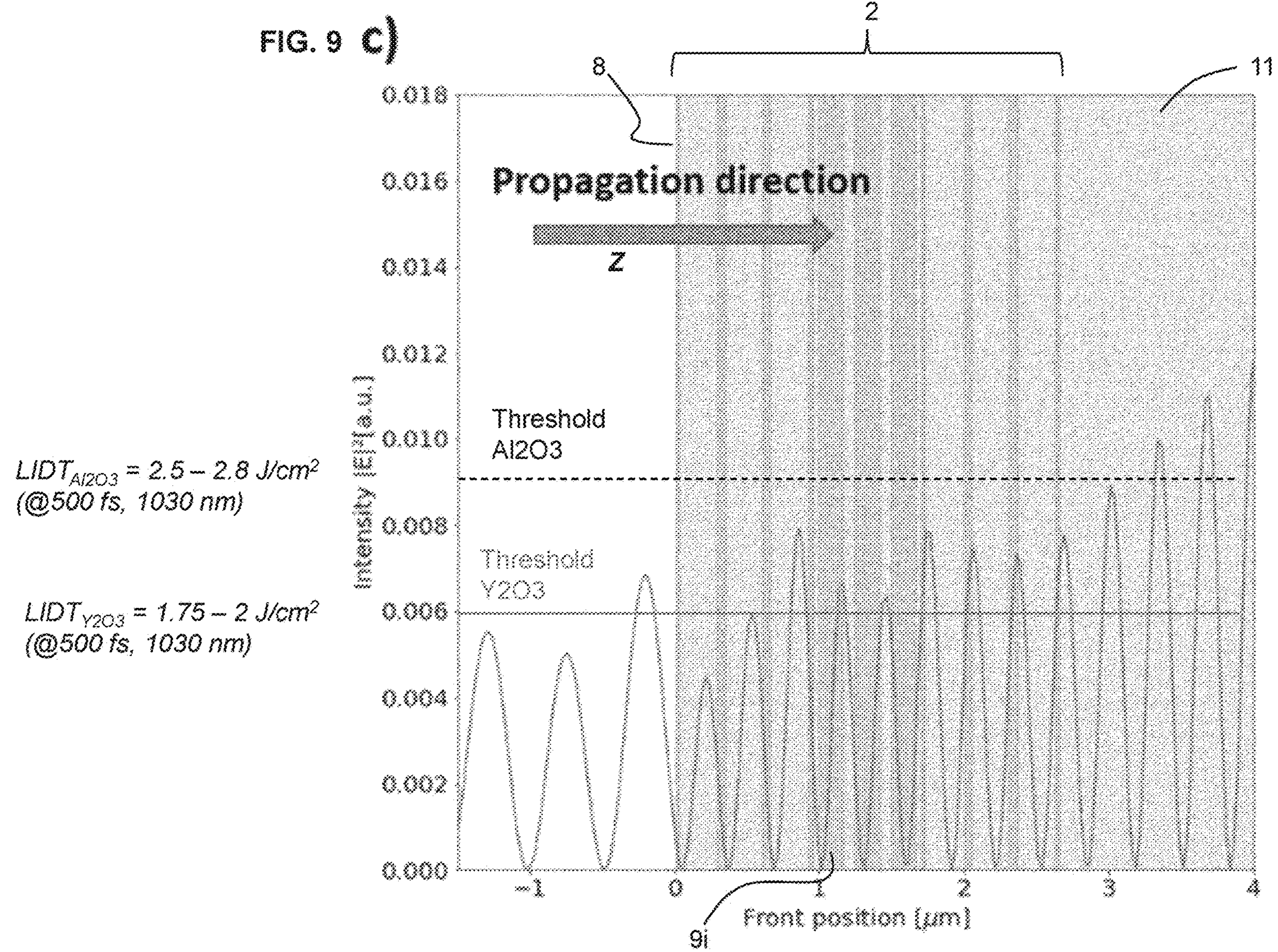

The modulation of the pulses electric field can be calculated with Finite-difference time-domain (FDTD) computer simulations, which show the confinement of the electric field in a variety of materials systems and of layers designs, with some examples shown in FIG. 9. In FIG. 9 *a*), the simulated sample geometry is the same as the physical embodiment illustrated in FIG. 8, consisting of the same aperiodic alternating $SiO_2/TiO_2$ layers. In FIG. 9 *b*) and c), different layer design and layer compositions are tested, showing that the modulation can be achieved with a variety of designs, and is not restricted to a single material system or geometry.

In these computer simulations, we suggest that the field intensity reaches the modification threshold (threshold $TiO_2$) of the "weakest" material of the system, which is generally the high-index material, in a specific layer, where non-linear absorption is initiated. The lack of modifications in the other material (here $SiO_2$, a lower index material) and in the following layers of the "weak" material is explained, respectively, with a highest modification threshold of the low-index material, which is not reached, and the absorption of the pulse energy in the first high-index layer where the threshold is reached, therefore "screening" the following layers.

Figure 12:
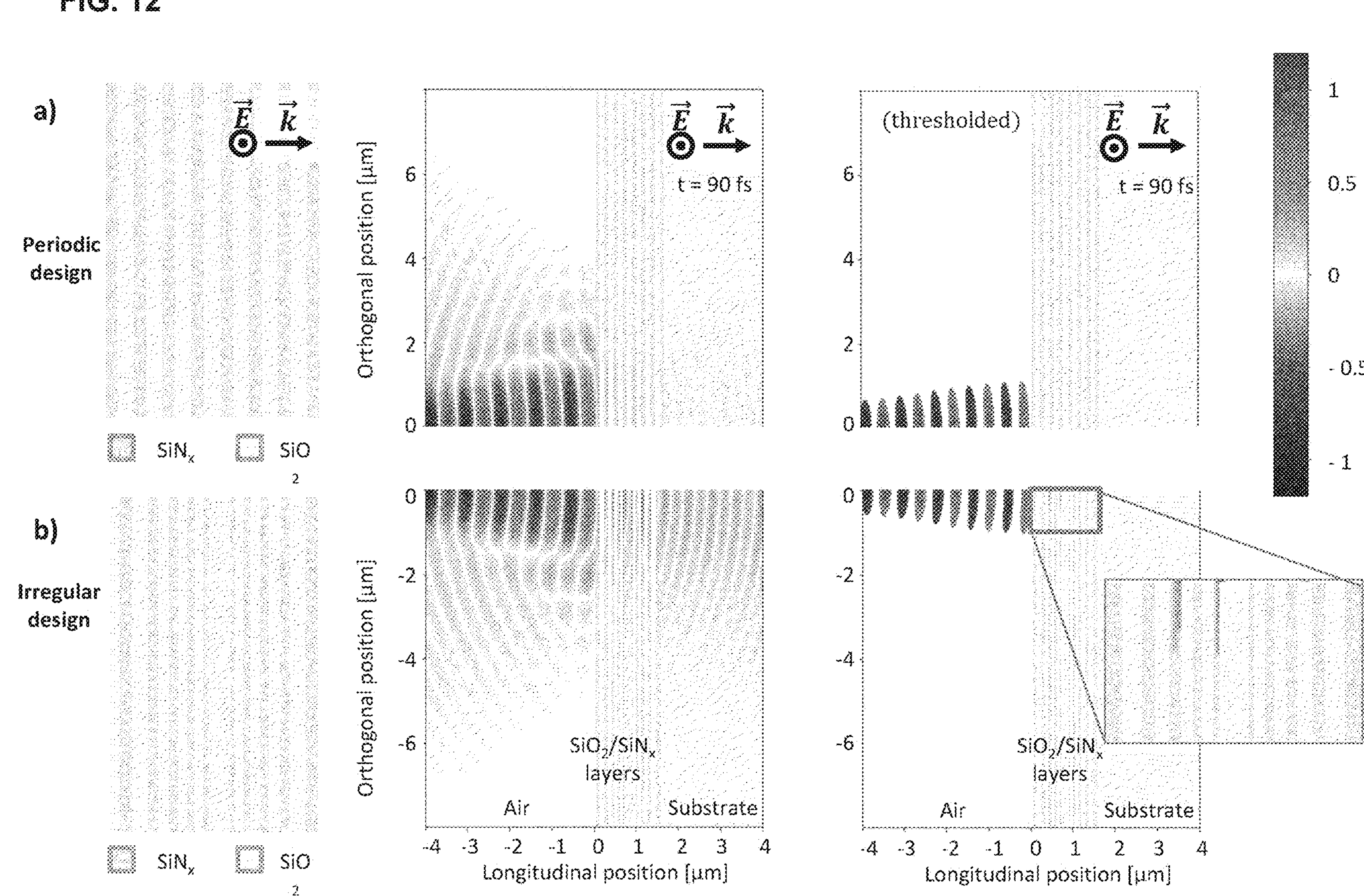
FIG. 12 show graphs of electric field profile of a pulse propagation through a) a periodic design and b) an irregular design. Field enhancement effects are shown on the right side of the image (showing only the electric field intensity above a fixed threshold), and are only present in the case of irregular design.

FIG. 12 shows a second example of computer simulation, illustrating how the electric field (for the same exposure parameters) is enhanced in the irregular design, but not in the periodic design, where the field decays exponentially.

Figure 13:
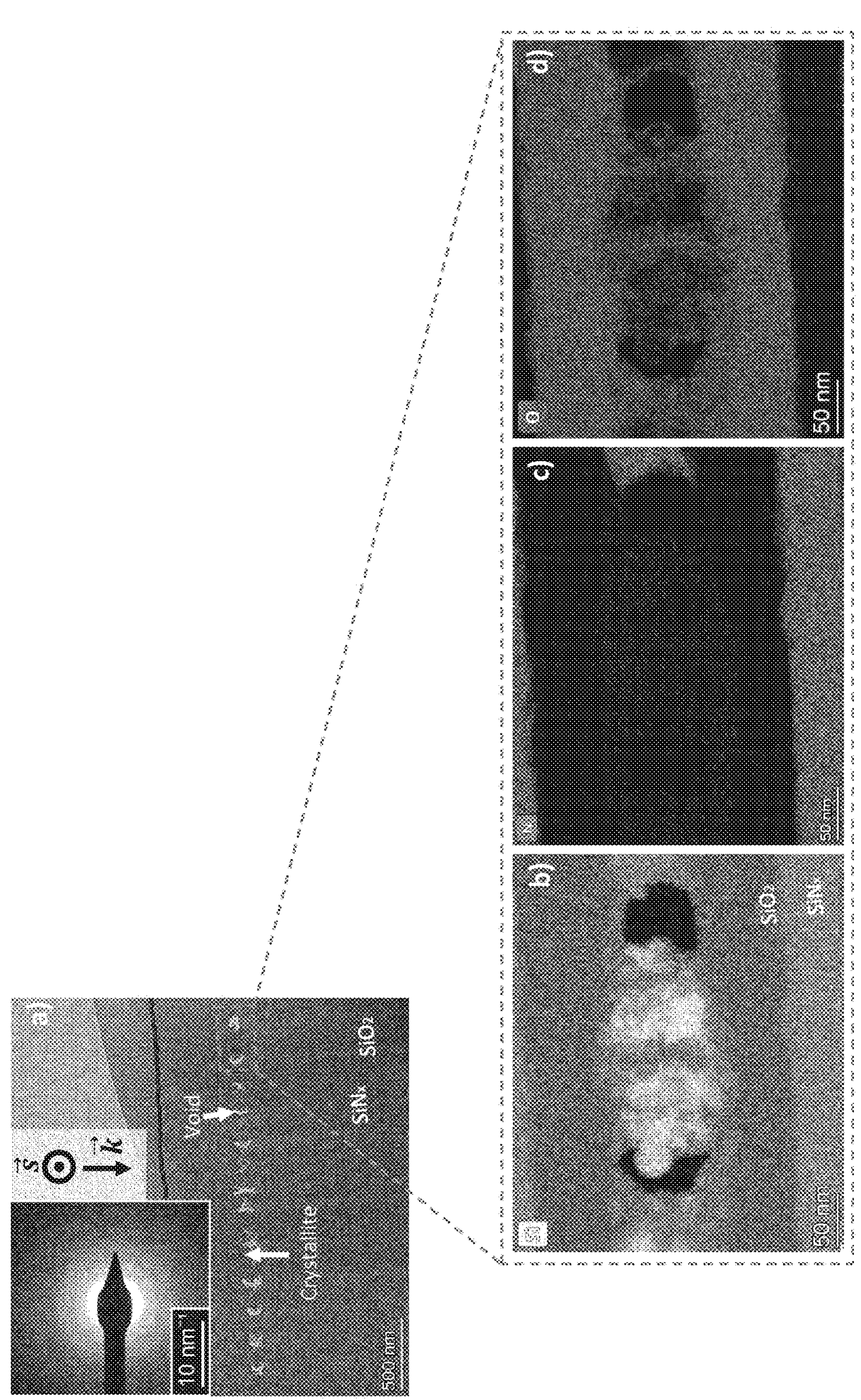
FIG. 13 shows experimental evidence of confinement of a $SiO_2$/SiNx multilayer with same geometry as the irregular design shown in FIG. 12.

The design calculated in FIG. 12*b*) has been tested experimentally, and evidence of confined modifications can be found in FIG. 13. Here, the laser-induced modifications, which include the formation of silicon crystallites, occurs in the third SiNx layer from the top, as calculated in the simulations.

Advantages:

There is a strong need for non-volatile, energy efficient, durable and reliable data storage techniques that is economical.

The invention solves problems in data storage durability, since it offers solutions for permanent data storage (>100+ years). The constituting materials of may be selected among durable materials that are resistant to high temperature, humidity, fire and electromagnetic fields, therefore suitable for permanent data storage.

The invention allows to lower energy consumption of permanent data storage systems. The cost for writing is substantially related to the processing time and energy usage. As very little energy is used (a few nJ per pulse), the femtosecond laser sources could be of pocket sizes and reduced costs.

A surprising feature of the invention are the small dimensions and the confinement of the laser-induced modifications along the propagation axis, due to aperiodic nature of the thin-film layer arrangements, which allows to have a reliable high density data storage. This is particularly apparent if the Rayleigh length is taken into account: according to the confocal parameters of the processing platform setup used for preliminary tests, the Rayleigh length, or the region of the beam where non-linear absorption is expected to take pace, is 2.47 μm long. If one compares this value with the thickness of an individual layer, which is comprised between 50 and 200 nm, it is possible to see that the confinement may be done in a space whose dimensions correspond to less than 8% of the Rayleigh length.

There is also great versatility in the choice of the constituting materials and on the use of the lasers. It is also possible to increase the density of information by writing on parallel layers.

| List of feature references: |
| --- |
| Optical data storage system 100 |
| Data storage device 1 |
| Data storage medium 2 |
| Top surface 8 |
| Layers 9 |
| Information layer(s) 9i |
| Modified zone 10 |
| Data bit |
| Upper layers |
| Lower layer(s) |
| Layer material |
| Substrate 11 |
| Data writer 3 |
| Laser source 4 |
| Laser beam 7 |
| Beam waist 12 |
| Beam Rayleigh length 13 |
| Controller 5 |
| Displacement mechanism 6, 6a, 6b |
| Data reader |
| Laser propagation direction Z |
| Rayleigh length Lr |
| Beam waist length ω |

-continued

| List of feature references: |
| --- |
| Layer thickness t |
| Laser wavelength λ |
| Beam waist position (depth) zi |
| laser beam polarization P |
| Laser pulse energy $E_p$ |
| Pulse repetition rate f |
| Scan speed v |
| Scan direction S |

The invention claimed is:

1. A data storage medium, comprising:

a stacked plurality of layers, each layer composed of a layer material selected from a group comprising at least two different dielectric materials, adjacent layers being formed of different materials, at least one of the layers, that is not a top layer, constituting an information layer configured to be modified locally by energy from an electromagnetic beam having a specific beam wavelength and a propagation direction (Z) transverse to the layers, and at least one of the layers constituting a spacer layer configured not to be modified locally by energy from said electromagnetic beam, wherein the stacked plurality of layers include an aperiodic layer arrangement including at least three stacked adjacent spacer layers having different thicknesses with respect to each other, said information layer downstream and adjacent the aperiodic stacked layer arrangement, wherein the information layer has a thickness t in the propagation direction Z, of equal or less than $\lambda/4\eta$: $t \leq \lambda/4\eta$ where λ is said specific beam wavelength and η is the refractive index of the material, the thickness ti of the information layer being preferably in a range of $\lambda/20\eta < ti < \lambda/4\eta$, more preferably $\lambda/10\eta < ti < 5\eta$.

2. The data storage medium according to claim 1, wherein the layer material of each layer is selected from a group consisting of $SiO_2$, $Si_3N_4$, $TiO_2$, $Al_2O_3$, $Y_2O_3$, $TaO_2$, $Nb_2O_5$, $ZrO_2$, $MgF_3$, $HfO_2$, $BaF_2$, MgO, $CaF_2$, $LaAl2O_3$, and $SrTiO_3$ with or without doping.

3. The data storage medium according to claim 1, wherein each layer of the aperiodic arrangement has a substantially constant thickness over the surface area of the data storage medium, the thickness varying within a tolerance in the range of ±5 nm preferably in the range±2 nm, for instance in the range of ±1 nm.

4. The data storage medium according to claim 1, wherein said plurality of layers comprises N layers, N being in the range of 4 to 30 layers, preferably in a range of 5 to 25 layers, for instance in a range of 10 to 20 layers.

5. The data storage medium according to claim 1, wherein said information layer is below the top layer and at least another layer and above at least one bottom layer, preferably above at least two bottom layers and below at least two upper layers.

6. The data storage medium according to claim 1, wherein the stacked plurality of layers are sandwiched between two substrates, at least one of said two substrates facing the laser-beam being transparent to the beam wavelength.

7. The data storage medium according to claim 1, further comprising at least a second information layer, said second information layer being separated from said first information layer by at least one further layer, preferably by a plurality of intermediate layers.

8. A data storage device comprising the data storage medium according to claim 1.

9. An optical data storage system comprising the data storage device according to claim 8, and a data writer, wherein the data writer comprises a laser source for generating a laser beam constituting the electromagnetic beam configured to generate the modified zone within the information layer, the data writer further comprising or connected to a controller configured to generate a pulsed laser beam.

10. The optical data storage system according to claim 9, wherein the laser source is configured to focus said laser beam such that a beam waist of the laser beam is positioned upstream of the information layer and within 1.5 of a Rayleigh length 1.5×Lr of the beam with respect to the beam propagation direction Z, preferably within a Rayleigh length Lr, for instance with a Rayleigh half-length Lr/2.

11. The optical data storage system according to claim 9, wherein the peak power of each pulse of said pulsed laser beam is configured such that the energy intensity at the location of the information layer is up to two times an energy intensity necessary to enable non-linear absorption in the information layer.

12. The optical data storage system according to claim 9, wherein the data storage device includes a disc configured for being rotated during writing and reading operations, and the data writer comprises a rotating drive on which the data storage device is coupled during writing.

13. The optical data storage system according to claim 9 wherein the laser source is configured to generate a Pico-second or Femtosecond laser pulse train with a pulse width in a range of 1e(−12) to 1e(−15) seconds, and a frequency of between 1 hertz to 1 gigahertz.

14. The optical data storage system according to claim 9, wherein the laser source is configured to deliver a static or reconfigurable plurality of focal spots at the information layer, for instance using diffractive elements or adaptive optics means such as deformable mirrors or liquid crystal displays, each focal spot acting to generate a modified zone independent from the modified zones generated by other focal spots of said plurality of focal spots.

15. A data storage medium, comprising:

a stacked plurality of layers, each layer composed of a layer material selected from a group comprising at least two different dielectric materials, adjacent layers being formed of different materials, at least one of the layers, that is not a top layer, constituting an information layer configured to be modified locally by energy from an electromagnetic beam having a specific beam wavelength and a propagation direction (Z) transverse to the layers, and at least one of the layers constituting a spacer layer configured not to be modified locally by energy from said electromagnetic beam, wherein the stacked plurality of layers include an aperiodic layer arrangement including at least three stacked adjacent spacer layers having different thicknesses with respect to each other, said information layer downstream and adjacent the aperiodic stacked layer arrangement, wherein the information layer has a thickness of less than 20% (ti<0.2Lr), preferably less than 15% (ti<0.15Lr), of a Rayleigh length Lr of the electromagnetic beam in the data storage medium.

16. The data storage medium according to claim 15, wherein the layer material of each layer is selected from a group consisting of $SiO_2$, $Si_3N_4$, $TiO_2$, $Al_2O_3$, $Y_2O_3$, $TaO_2$, $Nb_2O_5$, $ZrO_2$, $MgF_3$, $HfO_2$, $BaF_2$, MgO, $CaF_2$, $LaAl2O_3$, and $SrTiO_3$ with or without doping.

17. The data storage medium according to claim 15, wherein each layer of the aperiodic arrangement has a substantially constant thickness over the surface area of the data storage medium, the thickness varying within a tolerance in the range of ±5 nm preferably in the range±2 nm, for instance in the range of ±1 nm.

18. The data storage medium according to claim 15, wherein said plurality of layers comprises N layers, N being in the range of 4 to 30 layers, preferably in a range of 5 to 25 layers, for instance in a range of 10 to 20 layers.

19. The data storage medium according to claim 15, wherein said information layer is below the top layer and at least another layer and above at least one bottom layer, preferably above at least two bottom layers and below at least two upper layers.

20. The data storage medium according to claim 15, wherein the stacked plurality of layers are sandwiched between two substrates, at least one of said two substrates facing the laser-beam being transparent to the beam wavelength.

21. The data storage medium according to claim 15, further comprising at least a second information layer, said second information layer being separated from said first information layer by at least one further layer, preferably by a plurality of intermediate layers.

22. A data storage device comprising the data storage medium according to claim 15.

23. An optical data storage system comprising the data storage device according to claim 22, and a data writer, wherein the data writer comprises a laser source for generating a laser beam constituting the electromagnetic beam configured to generate the modified zone within the information layer, the data writer further comprising or connected to a controller configured to generate a pulsed laser beam.

24. The optical data storage system according to claim 23, wherein the laser source is configured to focus said laser beam such that a beam waist of the laser beam is positioned upstream of the information layer and within 1.5 of a Rayleigh length 1.5×Lr of the beam with respect to the beam propagation direction Z, preferably within a Rayleigh length Lr, for instance with a Rayleigh half-length Lr/2.

25. The optical data storage system according to claim 23, wherein the peak power of each pulse of said pulsed laser beam is configured such that the energy intensity at the location of the information layer is up to two times an energy intensity necessary to enable non-linear absorption in the information layer.

26. The optical data storage system according to claim 23, wherein the data storage device includes a disc configured for being rotated during writing and reading operations, and the data writer comprises a rotating drive on which the data storage device is coupled during writing.

27. The optical data storage system according to claim 23, wherein the laser source is configured to generate a Picosecond or Femtosecond laser pulse train with a pulse width in a range of 1e(−12) to 1e(−15) seconds, and a frequency of between 1 hertz to 1 gigahertz.

28. The optical data storage system according to claim 23, wherein the laser source is configured to deliver a static or reconfigurable plurality of focal spots at the information layer, for instance using diffractive elements or adaptive optics means such as deformable mirrors or liquid crystal displays, each focal spot acting to generate a modified zone independent from the modified zones generated by other focal spots of said plurality of focal spots.

* * * * *